United States Patent
Homann et al.

(10) Patent No.: US 6,890,477 B2
(45) Date of Patent: May 10, 2005

(54) PLASTIC INJECTION MOLDED ARTICLES WITH HOLLOW RIB MEMBERS

(75) Inventors: Gregory A. Homann, Canton, MI (US); David Turczynski, Highland, MI (US)

(73) Assignee: Lear Corporation, Southfield, MI (US)

( * ) Notice: Subject to any disclaimer, the term of this patent is extended or adjusted under 35 U.S.C. 154(b) by 133 days.

(21) Appl. No.: 10/249,237

(22) Filed: Mar. 25, 2003

(65) Prior Publication Data

US 2004/0188892 A1 Sep. 30, 2004

(51) Int. Cl.[7] ............................................. B29D 22/00
(52) U.S. Cl. ........................................ 264/572; 425/130
(58) Field of Search ............................ 264/572; 425/130

(56) References Cited

U.S. PATENT DOCUMENTS

| | | |
|---|---|---|
| 2,331,688 A | 10/1943 | Hobson |
| 2,345,144 A | 3/1944 | Opavsky |
| 2,714,747 A | 8/1955 | Lindemann |
| 2,714,748 A | 8/1955 | Stimemann |
| 3,021,559 A | 2/1962 | Strong |
| 3,044,118 A | 7/1962 | Bernhardt |
| 3,135,640 A | 6/1964 | Kepka |
| 3,288,898 A | 11/1966 | West |
| 3,687,582 A | 8/1972 | Hendry et al. |
| 3,966,372 A | 6/1976 | Yasuike et al. |
| 4,033,710 A | 7/1977 | Hanning |
| 4,078,875 A | 3/1978 | Eckardt |
| 4,082,226 A | 4/1978 | Appleman et al. |
| 4,091,057 A | 5/1978 | Weber |
| 4,092,389 A | 5/1978 | Sakurai |
| 4,101,617 A | 7/1978 | Friederich |
| 4,104,353 A | 8/1978 | Monnet |
| 4,106,887 A | 8/1978 | Yasuike et al. |
| 4,129,635 A | 12/1978 | Yasuike et al. |
| 4,136,220 A | 1/1979 | Olabisi |
| 4,140,672 A | 2/1979 | Kataoka |
| 4,208,368 A | 6/1980 | Egli |
| 4,234,642 A | 11/1980 | Olabisi |
| 4,247,515 A | 1/1981 | Olabisi |
| 4,255,368 A | 3/1981 | Olabisi |
| 4,333,608 A | 6/1982 | Hendry |
| 4,357,296 A | 11/1982 | Hafele |
| 4,474,717 A | 10/1984 | Hendry |
| 4,555,225 A | 11/1985 | Hendry |
| 4,601,870 A | 7/1986 | Sasaki |
| 4,604,044 A | 8/1986 | Hafele |
| 4,740,150 A | 4/1988 | Sayer |
| 4,781,554 A | 11/1988 | Hendry |
| 5,028,377 A | 7/1991 | Hendry |
| 5,069,858 A | 12/1991 | Hendry |

(Continued)

FOREIGN PATENT DOCUMENTS

| | | |
|---|---|---|
| CA | 2125623 | 12/1994 |
| DE | 651 725 | 10/1937 |
| DE | 1194127 | 6/1965 |
| DE | 2 159 344 | 5/1972 |
| DE | 2 106 546 | 8/1972 |
| DE | 2651725 | 4/1978 |
| DE | 3444532 | 6/1986 |

(Continued)

Primary Examiner—Suzanne E. McDowell
(74) Attorney, Agent, or Firm—Bill Panagos, Esq.

(57) ABSTRACT

A method and system for producing hollow rib structures for trim components and panels using gas assisted injection molding. Spring biased movable insert members are provided in the mold cavity, particularly at the ends of the structural rib members. After the plastic material is injected into the mold cavity, gas is introduced into the rib members in order to provide hollow channels therein. The displaced resin material forces the insert members to the full cavity positions and completes the formation of the molded plastic article.

12 Claims, 3 Drawing Sheets

U.S. PATENT DOCUMENTS

| | | | |
|---|---|---|---|
| 5,069,859 A | 12/1991 | Loren | |
| 5,090,886 A | 2/1992 | Jaroschek | |
| 5,098,637 A | 3/1992 | Hendry | |
| 5,204,050 A | 4/1993 | Loren | |
| 5,204,051 A | 4/1993 | Jaroschek | |
| 5,417,916 A | 5/1995 | Ladney | |
| 5,423,667 A | 6/1995 | Jaroschek | |
| 5,607,640 A | 3/1997 | Hendry | |
| 5,759,479 A | 6/1998 | Gotterbauer | |
| 5,849,377 A * | 12/1998 | Horikoshi et al. | 428/35.7 |
| 5,885,518 A | 3/1999 | Hendry | |
| 5,928,677 A | 7/1999 | Gosdin | |
| 6,019,918 A | 2/2000 | Guergov | |
| 6,024,911 A | 2/2000 | Brauner | |
| 6,143,237 A * | 11/2000 | Eckardt et al. | 264/572 |
| 6,159,415 A | 12/2000 | Tanada | |
| 6,354,826 B1 | 3/2002 | Thomas | |
| 6,372,177 B1 | 4/2002 | Hildesson et al. | |
| 6,375,892 B2 | 4/2002 | Thomas | |
| 6,576,170 B1 | 6/2003 | Nunnery et al. | |
| 6,579,489 B1 | 6/2003 | Thomas | |
| 6,602,460 B2 | 8/2003 | Thomas et al. | |
| 2003/0011110 A1 | 1/2003 | Pearson | |
| 2003/0011111 A1 | 1/2003 | Pearson | |

FOREIGN PATENT DOCUMENTS

| | | |
|---|---|---|
| DE | 40 02 503 | 1/1990 |
| DE | 39 13 109 A1 | 10/1990 |
| DE | 40 33 298 | 5/1991 |
| DE | 43 34 012 | 10/1993 |
| DE | 43 34 012 C1 | 10/1994 |
| DE | 195 31 709 A 1 | 3/1997 |
| DE | 10128458 | 2/2003 |
| EP | 0 289 230 | 11/1988 |
| EP | 0 309 182 | 3/1989 |
| EP | 0 309 257 | 3/1989 |
| EP | 0321117 | 6/1989 |
| EP | 0 321 117 | 6/1989 |
| EP | 0 402 730 | 6/1990 |
| EP | 0628395 | 6/1994 |
| EP | 0 950 493 | 10/1999 |
| FR | 1145411 | 10/1957 |
| FR | 2256021 | 7/1975 |
| GB | 1 460 101 | 12/1976 |
| GB | 1 487 187 | 9/1977 |
| GB | 2 100 661 | 1/1983 |
| GB | 2 122 130 | 1/1984 |
| GB | 2139548 | 11/1984 |
| GB | 2315050 | 1/1998 |
| JP | 50-74660 | 6/1975 |
| JP | 5714968 | 6/1975 |
| JP | 3009820 | 1/1991 |
| JP | 3-121820 | 5/1991 |
| JP | 4-62118 | 2/1992 |
| JP | 06155501 | 6/1994 |
| JP | 06297522 | 10/1994 |
| JP | 10291227 | 11/1998 |
| JP | 113333876 | 12/1999 |
| WO | WO 96/34731 | 11/1996 |

* cited by examiner

PLASTIC INJECTION MOLDED ARTICLES WITH HOLLOW RIB MEMBERS

BACKGROUND OF INVENTION

The present invention relates to plastic injection molding and more particularly to plastic injection molding using gas assist and the formation of hollow rib members on plastic injection molded parts.

In the plastic injection molding art, the usual challenges facing the product designer include designing an article having the requisite strength for the product application and satisfactory surface finish, as well as avoiding excessive weight, surface distortions, and increased cycle time. For flat or thin products, it is typical to include one or more rib members in the design to provide relative strength and structure for the molded article. The rib members are typically thicker than the molded article which increases the weight, material usage, and cycle time of the article, and often induces sink marks and other surface defects due to a thermal gradients in the area of the thickened section.

It is known in the plastic molding art to use pressurized gas, such as nitrogen, in conjunction with plastic injection molding of articles. Pressurized gas serves several purposes. The gas allows the article or rib structure to have hollow interior portions which result in savings in weight and material, thereby reducing costs. The pressurized gas also applies an outward pressure to force the plastic against the mold surfaces while the article solidifies. This helps provide a better surface on the molded article and also reduces or eliminates sink marks and other surface defects. The use of pressurized gas also reduces the cycle time as the gas is introduced and/or migrates to the most fluent inner volume of the plastic and replaces the plastic in those areas which would otherwise require an extended cooling cycle. The pressure of the gas pushing the plastic against the mold surfaces further increases the cooling effect of the mold on the part, thus solidifying the part in a faster manner and reducing the overall cycle time.

Where the rib members or other portions of the article in which the gas is being introduced are elongated, it is often difficult to provide a satisfactory molded article. For example, if the pressure of the gas is too great as it enters the mold cavity, there is a risk that it may rupture or blow out the plastic within the mold cavity, i.e. the gas is not contained within the plastic. Also, it is often difficult to have the gas migrate along the full length of an elongated, thicker plastic section, thus creating a product which has an uneven thickness and cooling cycle.

One manner which has been developed in order to overcome some of the above-mentioned problems is shown in U.S. Pat. No. 5,098,637. In that process, a secondary cavity (a/k/a "spillover" cavity) is provided at one end of the molded part or elongated rib member in order to collect and contain the more fluent plastic material which is forced out of the article or rib member by the pressurized gas.

SUMMARY OF INVENTION

An object of the present invention is to provide an improved method of gas assisted injection molding. It is another object of the present invention to provide an improved method and system for injection molding plastic parts with structural rib members.

It is a still further object of the present invention to, provide a method and system for gas assist injection molding which eliminates the need for spillover cavities and the subsequent capture and regrinding of excess plastic material from a mold cavity.

In accordance with the objects of the present invention, one or more movable insert members are provided in the mold cavity. The insert members are particularly located at the ends of elongated rib members in which pressurized gas is to be introduced in order to provide hollow portions in them. The insert members are held in place by spring or other biasing members or mechanisms which are adapted to be overcome by the force of the plastic and pressurized gas when the gas is introduced into the rib members.

After the plastic material (resin) is injected into the mold cavity, pressurized gas is introduced into one end of the rib members. As the gas channel is formed in the rib members and the fluent plastic material in the center of the rib members is pushed along the rib members and out the opposite ends, the spring or biasing force on the insert members is overcome. As the insert members retract, the plastic material completely fills the article defining mold cavity. The displaced plastic material flows into the area formerly occupied by the insert member, creating an additional rib or part of the molded article.

The insert member can be held in its initial position by spring tension, pressurized cylinders, damping mechanisms, and the like. These tensioning or biasing mechanisms provide a sufficient biasing force to resist the level of force caused by pressure in the mold from the injection of the plastic material. This maintains the nominal wall thickness of the article being molded throughout the full extent of the mold with the exception of the thicker section of the rib members. Once the cavity is full, pressurized gas is introduced at the end of the rib opposite the insert members. The resin being forced from the rib members overcomes the biasing force of the insert members.

If additional packing pressure of the resin or the article is required, (for example, for additional molded part features), the insert members can be fixed into position by use of an external locking mechanism, such as a pneumatic, hydraulic, or electric mechanism. The insert member can then be released by the use of various devices, such as position sensors, cavity pressure sensors, timers, or the like.

The above objects and other objects, features, and advantages of the present invention are readily apparent from the following detailed description of the preferred embodiments for carrying out the invention when taken in accordance with accompanying drawings.

DETAILED DESCRIPTION

The present invention is particularly suitable for producing hollow rib structures for structural reinforcement of decorative or non-decorative trim components and panels using gas-assist plastic injection molding.

Figure 1:
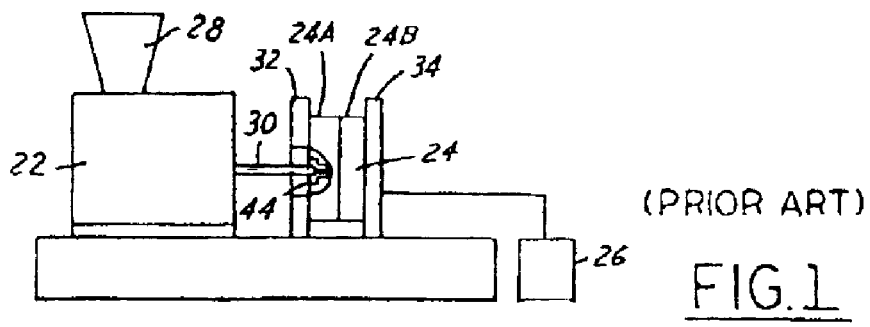
FIG. 1 is a schematic diagram of a typical plastic injection molding system.

As shown in FIG. 1, a conventional plastic injection molding system 20 is shown. The system 20 includes an injection molding machine 22, a mold 24, and a source of gas 26 for the gas assisted injection molding. As is well known in the injection molding field, injection molding machine 22 has a hopper 28 in which plastic pellets are added to the machine. The injection molding machine includes a mechanism for melting the plastic material and a screw-type ram (not shown) in the body of the machine. The molten plastic material is injected through a nozzle 30 into the mold 24.

Mold 24 includes two mold halves 24A and 24B. The two mold halves are connected to platens 32 and 34 which separate and close as one or more is moved on the injection molding machine.

The gas used in injection molding is typically an inert gas, such as nitrogen, and is supplied from a storage canister or system (not shown) to a gas injection controller 26. The controller 26 regulates the flow of gas through a conduit 36 or the like into the mold 24.

The biasing force or spring tension holding the insert member in place preferably should be sufficient to resist force of 150–200 psi (10.4–13.8 bars).

Figure 2:
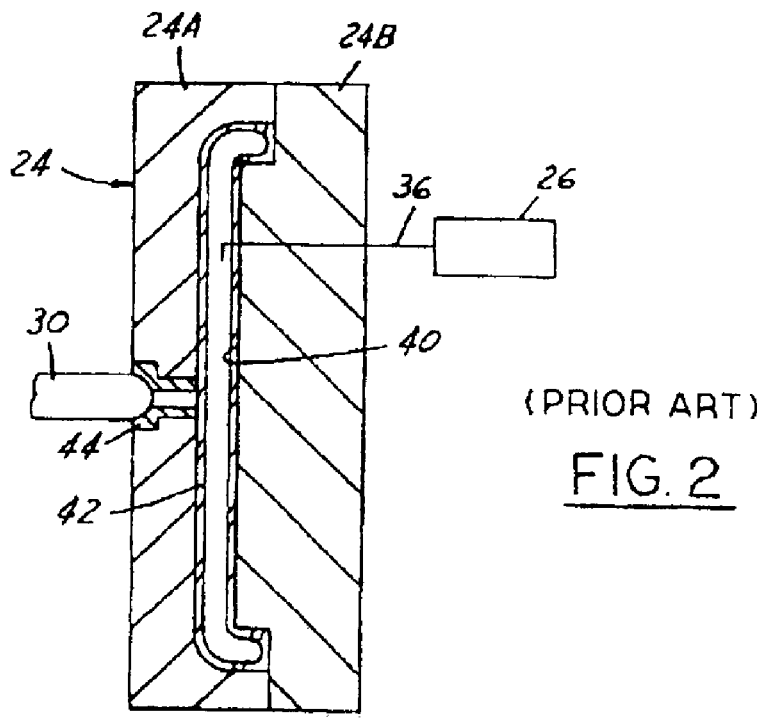
FIG. 2 is a schematic diagram of an article being molded in a conventional gas assisted plastic injection molded system.

It is to be understood that the present invention can be used with any plastic injection molding machine 22, any gas assist controller 26, and virtually any type of mold 24. In this regard, a schematic drawing of a representative mold 24 is shown in FIG. 2.

An article forming cavity 40 is provided between the two mold halves 24A and 24B. The plastic material 42 is injected through the machine nozzle 30, and through a bushing 44 into the mold cavity 40. After all or a substantial portion of the plastic material 42 is injected into the mold cavity 40, gas from the controller 26 is introduced into the mold cavity. The gas forces the plastic material into all portions and into all surfaces of the mold cavity 40 and provides a hollow interior 46.

Once the plastic material 42 has cooled and solidified in the mold, the gas is vented, and the mold is then opened in order to allow the part to be removed. In this regard, there are many mechanism systems known for venting gas from the mold and any conventional system and method can be utilized. For example, gas can be vented back through the conduit 36 to the controller, the nozzle 30 can be backed off from the bushing 44 creating a "sprue break," or the like. Also, plastic formed articles are typically assisted in being removed from the mold by one or more ejector pins (not shown).

Figure 3:
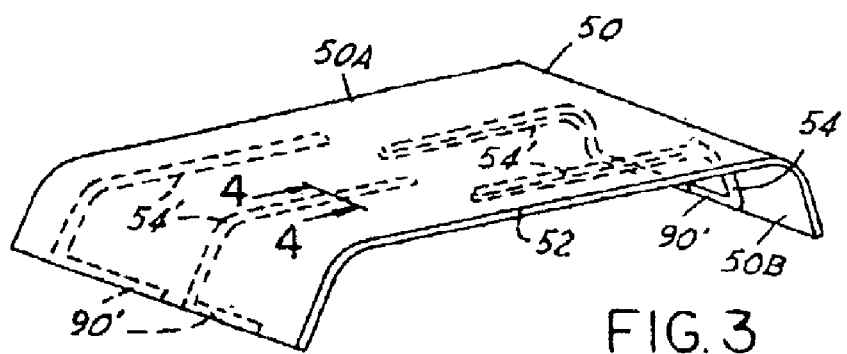
FIG. 3 is a perspective view of a molded part or article according to the present invention.

As indicated, the present invention is particularly suitable for producing plastic injection molded trim components and panels having rib members. A representative article of this type is shown in FIG. 3 and identified generally by the reference numeral 50. As shown, the article 50 has a relatively thin thickness 52 relative to its width and length and has a plurality of rib members 54 on one surface. The outer surface 50A of the article 50 is the surface which is exposed to view when the part is used or installed in its appropriate environment. The article 50 could be, for example, a computer housing, a panel for a door or other article of a vehicle, or the like. Rib members 54 are provided on the opposite side 50B and are hidden from view during normal use of the article 50. Although four rib members 54 are shown on the article 50, any number of rib members may be utilized. The rib members in particular provide structural support for the panel-type article 50.

Since the rib members 54 are typically thicker in dimension than the width or thickness of the article 50, gas assist injection molding techniques and procedures are typically utilized in order to hollow out the rib members. This reduces the thickness of the rib members, thereby saving material cost, reducing cycle times, and minimizing or eliminating surface defects, such as sink marks, on the viewed surface 50A.

The term "gas" used herein means any gas body gaseous during normal temperature and pressure, such as nitrogen, carbon dioxide and air. Preferably, the gas is an inert material, such as nitrogen or carbon dioxide. The gas can be provided from any conventional source, such as a storage tank, bottled gas, or the like.

Figure 4:
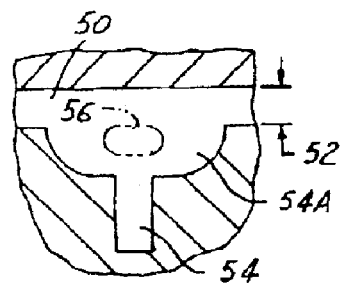
FIG. 4 is a cross-section of a structural rib member on a part made in accordance with the present invention, the cross-section being taken along lines 4—4 in FIG. 3 and in the direction of the arrows.

A rib member 54 is shown in cross-section in FIG. 4. The article 50 has a certain thickness 52 which requires a certain cooling and cycle time. In order to provide requisite structural support, the rib member 54 typically has thicker portions, such as 54A. In order to lighten the weight of the rib member 54 and reduce its thickness, a channel 56 is provided in the rib member by the introduction of the pressurized gas.

Although the injection molding system is shown utilizing a single bushing member 44 positioned between the nozzle 30 of the injection molding machine 22 and the mold 24, it is understood that any conventional system could be utilized in injection in providing the molten plastic material from the nozzle 30 to the mold cavity 40. For example, a hot runner system, manifold, and a plurality of bushings could be utilized.

Figure 6:
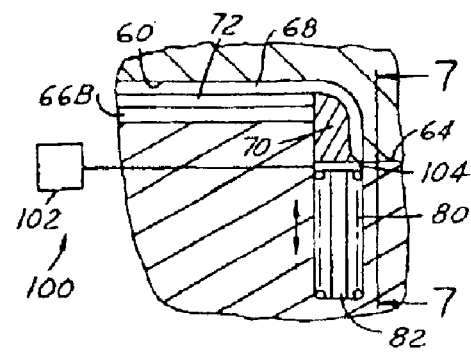
FIG. 6 is a partial cross-sectional view showing an insert member in accordance with the present invention.
Figure 5:
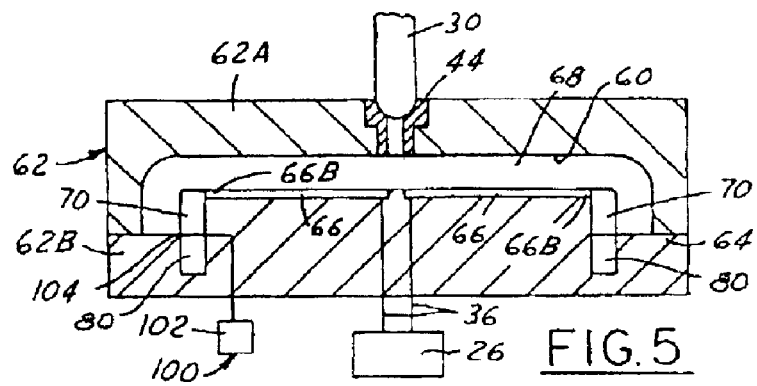
FIG. 5 is a cross-sectional view of a mold utilizing an embodiment of the present invention.
Figure 7:
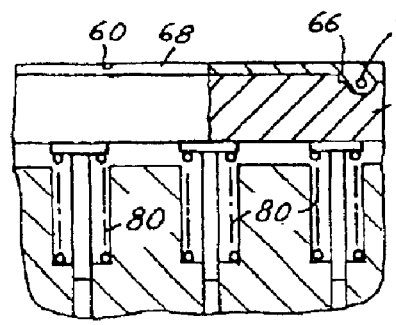
FIG. 7 is another view of an insert member in accordance with the present invention, the view being taken in the direction of the arrows 7—7 in FIG. 6.
Figure 8:
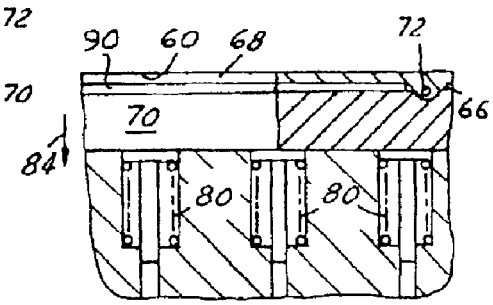
FIG. 8 is another view of the insert member and mechanism as shown in FIG. 7, with the insert member being displaced in response to the introduction of gas in a rib member.
Figure 9:
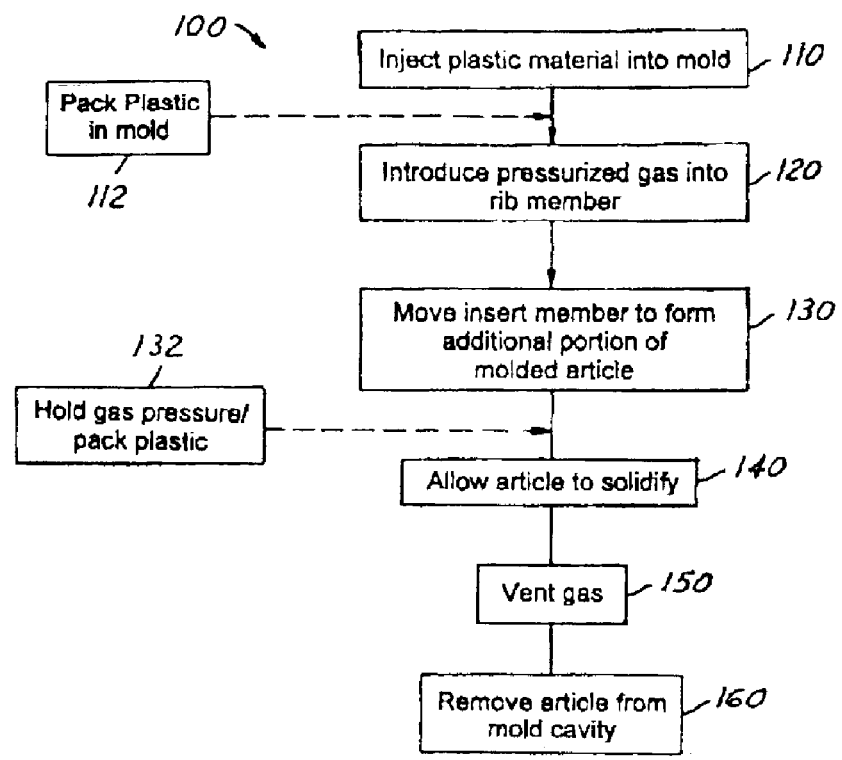
FIG. 9 is a flow chart indicating the basic steps involved in the practice of the method of the present invention.

A representative molding system in which the present invention is utilized is shown in FIG. 5. Further details of this embodiment are shown in FIGS. 6–8. The basic steps in the inventive process are depicted in FIG. 9.

The present invention can be used with all types of plastic materials, particularly thermoplastic materials, which generally may be injection molded. These materials can be, for example, low or high density polyethylene, polyurethane, polypropylene, polystyrene, acrylonitrile butadiene styrene (ABS) resin, SAN resin, polyvinyl chloride, polymethyl methacrylate, and the like. Materials such as polycarbonate, polyester, acetyl, polyacetyl and nylon also may be used, as well as ethylene copolymers such as ethylene-vinyl acetate copolymer, ethylene-ethyl acrylate copolymer, and the like. Furthermore, any of these resins may contain fillers, such as glass fiber, powdered glass, calcium carbonate, calcium sulfate, talc, mica, and the like.

In accordance with the present invention, molten plastic material is injected from a machine nozzle 30 to a bushing 44 and into a mold cavity 60 in a mold 62. The two mold halves 62A and 62B are adapted to separate along part line 64 in order to allow the formed plastic article to be removed.

A gas regulated by gas controller 26 is introduced through conduit 36 into one end 66A of rib member 66 on the plastic article 68, which is formed in the mold cavity 60. A movable insert member 70 is also provided in the mold cavity 60, and it is positioned such that it is situated at the opposite end 66B of the rib member 66. Pressurized gas is introduced into the rib member 66 and forms a channel 72 essentially through the center of the cross-section and throughout its length.

The gas is injected into the resin in the mold at a pressure higher than the plastic injection pressure and typically at a much higher pressure. For example, the plastic injection pressure could be 100–200 psi, while the gas injection could be 1000–1500 psi (if, for example, the plastic material was polypropylene) and 3000–7000 psi (if, for example, engineering grade resins were used). In general; the pressure of the gas should be sufficient to provide a commercially acceptable surface and finish on the plastic part.

The insert members 70 are held in position in the mold cavity by a biasing or tensioning mechanism 80. In this regard, as shown in FIGS. 7 and 8, the insert member 70 is typically elongated in shape and thus a number of biasing mechanisms 80 are provided along its length. A biasing force is provided by the biasing mechanism 80 such as by a coil spring member 82 as shown in FIGS. 6–8. A spring member 82 provides a biasing force against the insert member 70 sufficient to oppose the force of the plastic material 68 when it is injected into the mold cavity 60.

The biasing force or spring tension holding the insert member in place preferably should be sufficient to resist a force of 150–200 psi (10.4–13.8 bars).

It is to be understood that any type of biasing, tension, or force-type member or mechanism can be used to hold the insert members in place. For example, gas or air charge cylinders can be utilized in place of the coil spring members 82, or a dampening mechanism of some type could be utilized. The biasing member has to provide a sufficient force or load on the insert member to resist the level of force caused by pressure in the mold cavity during the injection of the plastic material. This maintains the nominal wall thickness of the article 68 to the end of the flow length with the exception of the thicker section of the rib member 66.

As shown in FIGS. 7 and 8, the introduction of pressurized gas through the rib member 66 forms channel 72 in the rib member and forces plastic material against the insert member forcing it to move downwardly in the direction of the arrow 84 in FIG. 8. The additional space formed in the mold cavity by the movement of the insert member is filled with molten plastic forced from the rib member. The additional plastic forms an additional rib member 90 adjacent the end of the now hollow rib member 66. Additional rib members of this type are shown in FIG. 3 and identified by the reference numeral 90'. The additional rib members 9' are positioned at the end of the rib members 54 and can provide additional support and structural stability to the article 52. Depending on the amount of displaced plastic material and the gas injection pressure, it is also possible to provide a gas channel and thus a hollow structure through all or part of the rib member 90.

Although the invention is primarily directed to the formation of structural rib members on plastic injection molded articles, such as trim components and panels, it is also possible to use the present invention to produce or provide portions of articles necessary to allow appropriate molding. For example, it is often necessary to provide molded portions of an article in order to prevent undercuts and the like and thus to assist in the production of molds which can be opened and closed more easily and allow the parts to be removed and ejected.

The thickness of the additional rib member 90 should not be greater than the maximum thickness of any other part of the molded article (for minimum cycle times). Preferably, the rib member 90 has a maximum thickness which is at least 10% less than the maximum thickness of the article. In order to insure that size and thickness of the added portion or rib member 90 remains within predetermined limits, a stop member (not shown) can be utilized to limit the travel of the insert member 70.

Although the portion formed on the molded article by the displacement of the insert member is referred to herein as a rib member, it is to be understood that the portion can have the shape and size to add virtually any structure to the article, such as, for example, a boss, a snap fit member, etc. The portion can also be used to add additional strength to the article.

The size, shape and volume of the insert member and resultant added portion formed on the article should be predetermined, so that all ejected plastic material from the rib member can be accommodated. Similarly, the size of the added portion should be sufficient to accommodate for volumetric differences in the plastic material from the shot-to-shot (i.e. from cycle to cycle). The biasing mechanism 80 allows for such volumetric differences.

As an alternate embodiment, it is also possible to introduce the gas into the rib member 66 at a location in between the ends 66A and 66B. In such an embodiment, it is also possible to position insert members and form additional article portions at both ends of a rib member.

The basic steps in the process in accordance with the present invention are set forth in the flow diagram in FIG. 9. The basic method is referred to generally by reference numeral 100. As a first step, the plastic material is injected into the mold cavity in the mold. This is referred to by the reference numeral 110 in FIG. 9. This first step is completed after the precise mold cavity size and shape is selected, the mold cavity is machined in the mold, the appropriate hot runner system, bushing, and manifold mechanism is selected and provided, the requisite size of the injection molding machine is selected, the particular type of plastic or resin material for the article or part is selected and provided, and the appropriate processing parameters, such as time, pressures, temperatures, and cycle time, are determined.

Figure 10:
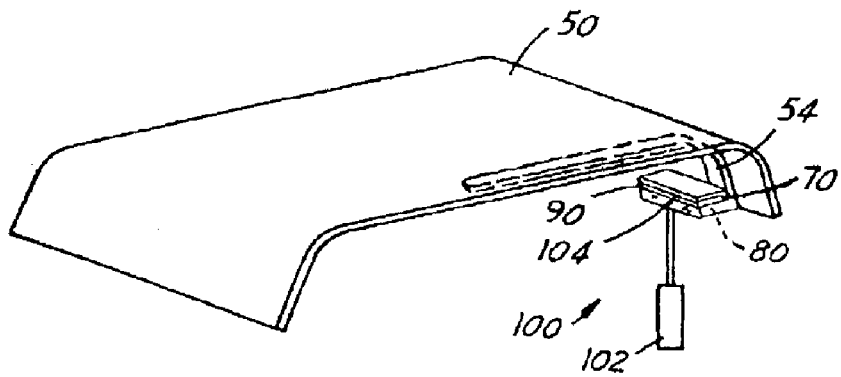
FIG. 10 is a schematic diagram depicting a locking mechanism for an insert member.

The molten plastic resin material is injected into the mold cavity by the injection molding machine until the article cavity is nearly full or full of plastic material. If some additional pressure (packing) of the plastic material is required for additional molded part features which is not uncommon, then additional pressure is provided at that point. This is shown as an alternative in Box No. 112 in FIG. 9. In this regard, in order to prevent the insert member from being dislodged or moving during the additional pressure or packing procedure, the insert members are held or locked into position by the use of an external locking mechanism 100 which can be a wedge, pin, or the like 102 (see FIGS. 5–6 and 10). The wedge 102 is situated in the mold to be moved into position preventing movement of the insert member 70. The wedge 102 is activated by a activation system 104, such as a pneumatic, hydraulic, electric, or mechanical mechanism or system and set and locked into position or released by the use of various devices, such as position sensors, cavity pressure sensors, timers, and the like (not shown).

After the mold cavity is full of or nearly full of molten plastic resin material, the gas is injected into one or more of the rib members. This is shown by Box No. 120 in FIG. 9. The gas is injected at one end of the rib members opposite the insert members and at a predetermined time and pressure.

The molten plastic material is displaced from the core or interior of the rib members creating an increase in pressure on the insert members. This pressure overcomes the biasing force caused by the spring mechanisms or the like, forcing the insert member away from its rest position and retracting to increase the available volume of the cavity. This is shown in Box 130 in FIG. 9. The displaced plastic material from the rib member will flow into the void formed by the displacement of the insert member. The range of movement of the insert member is preferably predetermined in order to provide an additional part or portion on the article of a certain size, shape, and length. At the end of movement of the insert member, the pressures equalize on the insert member, allowing the external gas pressure to provide packing pressure to the molded part throughout the rib members.

If desired, an additional packing pressure can be provided by the introduction of a higher pressurized gas. This is shown as an alternative in Box 132 in FIG. 9.

Once the mold cavity is filled with plastic material and the gas assist process is completed, the plastic article is allowed to cool and solidify in the mold. This is shown in Box 140 in FIG. 9. Thereafter, the gas is vented from the rib members as shown in Box 150. The venting of the gas from the rib members can be accomplished in any standard manner known to people of ordinary skill in the art. For example, one method allows the gas to vent back through the end of the rib members where the gas is initially introduced.

For the final step, the formed plastic part or article is removed from the mold cavity. This is shown in Box 160 in FIG. 9.

The rib members in which the gas is to be introduced should be designed to prevent the gas from escaping from the rib structure into the nominal wall thickness of the article. Also, the insert members should be dimensioned such that the increase in volume in the mold cavity is proportional to the volume of plastic material which is displaced by the injection of gas into the rib members. With the present invention, the mold cavity is increased in available volume at a predetermined point in the plastic injection molding process in order to allow the molten plastic resin from the interior of the rib members to be displaced by the introduction of the gas. The present invention does not require a secondary cavity external to the mold cavity for displacement of the plastic resin material. The insert members compensate for the volumetric variation due to resin viscosity variation inherent in injection molding processes.

With the present invention, volumes of plastic material from a secondary cavity do not have to be recycled or reground. This eliminates an additional processing step which results from other known processes.

Although the present invention has been described above with reference to formation of hollow rib structures and trim components or panels, it is to be understood that the present invention can be used in any gas assist injection molding processes.

While the invention has been described in connection with one or more embodiments, it is to be understood that the specific mechanisms, processes and procedures which have been described are merely illustrative of the principles of the invention, numerous modifications may be made to the methods and apparatus described without departing from the spirit and scope of the invention as defined by the appended claims.

What is claimed is:

1. A system for injection molding a plastic article having a hollow portion therein, the system comprising:
    a mold member having a mold cavity for defining an article, said cavity having at least one insert member positioned therein, and a biasing mechanism to hold said insert member in position during injection of plastic material;
    an injection molding machine for injecting a quantity of molten plastic material into the mold cavity;
    a gas introduction mechanism for introducing pressurized gas into at least a portion of the plastic material in the mold cavity;
    wherein the introduction of gas into the plastic material displaces said insert member against the force of said biasing mechanism and allows formation of the complete molded plastic article.

2. The system as described in claim 1 wherein said portion of the plastic material in which gas is introduced comprises at least one elongated rib member.

3. The system as described in claim 2 wherein at least two rib members and at least two insert members are provided, gas is introduced into each of said rib members, and each of said insert members are displaced by plastic material.

4. The system as described in claim 1 wherein said biasing mechanism comprises a spring mechanism.

5. The system as described in claim 1 further comprising a locking mechanism for selectively preventing movement of said insert member.

6. The system as described in claim 4 wherein said locking mechanism comprises a wedge or pin member.

7. A method for injection molding a plastic article with at least one hollow portion therein, said method comprising the steps of:
    providing a mold member with at least one moveable insert member in the mold cavity;
    providing a biasing member to prevent displacement of said insert member until a predetermined force is applied;
    injecting a quantity of plastic material into the mold cavity;
    introducing pressurized gas into at least one portion of the plastic material and displacing said moveable insert member to form the full article to be produced, said gas pressure being sufficient to overcome the force of aid biasing member;
    allowing the molded article to solidify;
    venting the gas from the mold cavity; and
    removing the completed article from the mold.

8. The method as described in claim 7 further comprising the step of packing the plastic material in the mold cavity prior to injection of said gas.

9. The method as described in claim 8 further comprising the step of locking said insert member in position prior to packing the plastic material in the mold cavity.

10. The method as described in claim 7 wherein at least two insert members are provided and each is displaced by pressurized gas.

11. The method as described in claim 7 wherein said displaced plastic material forms a structural member on said article.

12. The method as described in claim 7 wherein said plastic article has at least one elongated rib member and said insert member is positioned at one end of said rib member and said gas is introduced at the other end of said rib member.

* * * * *